(12) United States Patent  (10) Patent No.: US 8,621,231 B2
Tirbois et al.  (45) Date of Patent: Dec. 31, 2013

(54) METHOD AND SERVER FOR ACCESSING AN ELECTRONIC SAFE VIA A PLURALITY OF ENTITIES

(75) Inventors: Jean-Marie Tirbois, Chamalieres (FR); Michaël Chochois, Cesson-Sevigne (FR)

(73) Assignee: Almerys, Clermont Ferrand (FR)

( * ) Notice: Subject to any disclaimer, the term of this patent is extended or adjusted under 35 U.S.C. 154(b) by 615 days.

(21) Appl. No.: 12/332,235

(22) Filed: Dec. 10, 2008

(65) Prior Publication Data
US 2009/0235080 A1  Sep. 17, 2009

(30) Foreign Application Priority Data
Dec. 10, 2007 (FR) ...................................... 07 59698

(51) Int. Cl.
*H04L 29/06* (2006.01)
*G06F 21/00* (2013.01)

(52) U.S. Cl.
USPC .............................................. 713/185; 726/9

(58) Field of Classification Search
None
See application file for complete search history.

(56) References Cited

U.S. PATENT DOCUMENTS

| 5,991,414 A | 11/1999 | Garay et al. |
| 6,789,166 B2 * | 9/2004 | Kamise et al. ................. 711/115 |
| 2002/0138568 A1 * | 9/2002 | Johansson ....................... 709/203 |
| 2003/0084350 A1 | 5/2003 | Eibach et al. |
| 2003/0225765 A1 * | 12/2003 | Frieden et al. ..................... 707/9 |
| 2004/0010607 A1 * | 1/2004 | Lee et al. ........................ 709/229 |
| 2007/0219832 A1 * | 9/2007 | Willacy .............................. 705/5 |
| 2009/0171910 A1 * | 7/2009 | Sarkeshik .......................... 707/3 |

FOREIGN PATENT DOCUMENTS

| EP | 1 677 486 A1 | 7/2006 |
| WO | WO 02/103496 A2 | 12/2002 |
| WO | WO 03/009111 A2 | 1/2003 |

* cited by examiner

*Primary Examiner* — Gilberto Barron, Jr.
*Assistant Examiner* — Malcolm Cribbs
(74) *Attorney, Agent, or Firm* — McKenna Long & Aldridge LLP

(57) ABSTRACT

A method of managing electronic safes, comprising a step of authenticating a user requesting access to a safe, by means of authentication data of said user, said authentication data to be provided by the user being dependant of an entity by means of which the user is requesting said access.

8 Claims, 1 Drawing Sheet

METHOD AND SERVER FOR ACCESSING AN ELECTRONIC SAFE VIA A PLURALITY OF ENTITIES

CROSS REFERENCE TO RELATED APPLICATION

This application claims the benefit of the French Patent Application No. FR 07 59698, filed on Dec. 10, 2007, which is hereby incorporated by reference as if fully set forth herein.

FIELD OF INVENTION

The present invention concerns the field of electronic safes.

BACKGROUND OF INVENTION

Electronic safes comprise storage spaces, with secure access, for electronic data. They offer administrations, companies and private individuals a solution for storing, in electronic form, various content, for example pay slips, bank statements, insurance policies, photographs, etc. (see for example the website www.e-coffrefort.fr).

Such electronic safes are generally created, and then managed, by means of a server belonging to a trusted third party and accessible from a large number of terminals (computers, mobile telephones with WAP or Internet connection, etc.) by the users of the electronic safes.

When a company or an administration opens a safe for a user, it generally provides him with a security module, for example hardware (smart card, USB key, etc.), having means of storing in particular authentication data.

When the user wishes to access his electronic safe, he connects from a terminal, for example to a corresponding HTML page of the website of the company, and then carries out an authentication step using the security module.

The authentication step generally comprises reading authentication data stored in the security module in order to allow authentication of the user and, consequently, authorize or not the access to an electronic safe.

A user can have the benefit of several electronic safes: a safe offered by his employer, another by his bank and/or insurance company, by an administration, etc.

Nevertheless, it may be desirable to have a user take advantage of one and the same secure electronic data storage space or the same electronic safe, even when this service is offered to the user by different companies or administrations, both while allowing on the one hand the latter to manage this service offer independently of one another, and on the other hand while safeguarding security of access to the electronic safes.

SUMMARY OF THE INVENTION

According to a first aspect, the invention proposes a method of managing electronic safes, comprising a step of authenticating a user requesting access to a safe, by means of authentication data of said user, said authentication data to be provided by the user being dependant of an entity by means of which the user is requesting said access.

The present invention therefore allows the use of one and the same electronic safe by a user with the necessary access security, when this electronic safe supply service is made available to him by several companies or administrations (corresponding to the respective entities) by means in particular of respective smart cards comprising the authentication data. The authentication data of the user to be provided for accessing the safe by means of a first entity are different from the authentication data of the user to be provided for accessing this same safe by means of a second entity. The user can also have access to an additional electronic safe specific to the company or administration corresponding to the entity by means of which the user is requesting access.

The companies or administrations can, independently of one another, stop their electronic safe supply service with regard to a user.

In one embodiment, the method comprises a step of identifying the entity by means of which the user is requesting access to the safe and a step of determining authentication data to provide depending on the identified entity.

In one embodiment, the method comprises, when the user requests for the first time an access to the electronic safe by means of an entity from amongst a first and a second entity, a step of transmitting authentication data to a terminal of the user with a view to the storage of said authentication data in a hardware security module assigned to the user and associated specifically with said entity, the authentication data transmitted with a view to storage in the hardware security module associated with a first entity being different from the authentication data transmitted with a view to storage in the hardware security module associated with a second entity.

This measure makes it possible to control the provision of authentication data according to the entity by means of which the user requests the use of the electronic safe.

This measure also makes it possible for access to the electronic safe, offered by each company or administration corresponding to a respective entity, to be issued following a strong authentication of the user with the server. A given card allows access by means of a single entity, allowing increased security.

In one embodiment, the method comprises a step of signing and/or encryption, by means of a signature and/or encryption key, of data to be stored on request of said user in said electronic safe, the key used when the user requests storage in said electronic safe by means of a first entity being identical to that used when the user requests storage in said electronic safe by means of a second entity.

This measure makes it possible to use electronic data stored in the safe of the user independently of the entity by means of which the data were stored and of the entity by means of which the data are then used.

According to a second aspect, the invention proposes an electronic safe management server, comprising authentication means designed to authenticate a user requesting access to a safe by means of authentication data of said user, said authentication data to be provided by the user being dependant of an entity by means of which the user is requesting said access. According to a third aspect, the invention proposes a computer program comprising instructions for implementing the steps of a method according to the first aspect of the invention during execution of the program on a computer.

BRIEF DESCRIPTION OF THE DRAWINGS

Other characteristics and advantages of the invention will emerge further from a reading of the following description. This is purely illustrative and must be read with reference to the accompanying drawings in which.

DESCRIPTION OF THE PREFERRED EMBODIMENTS

Figure 1:
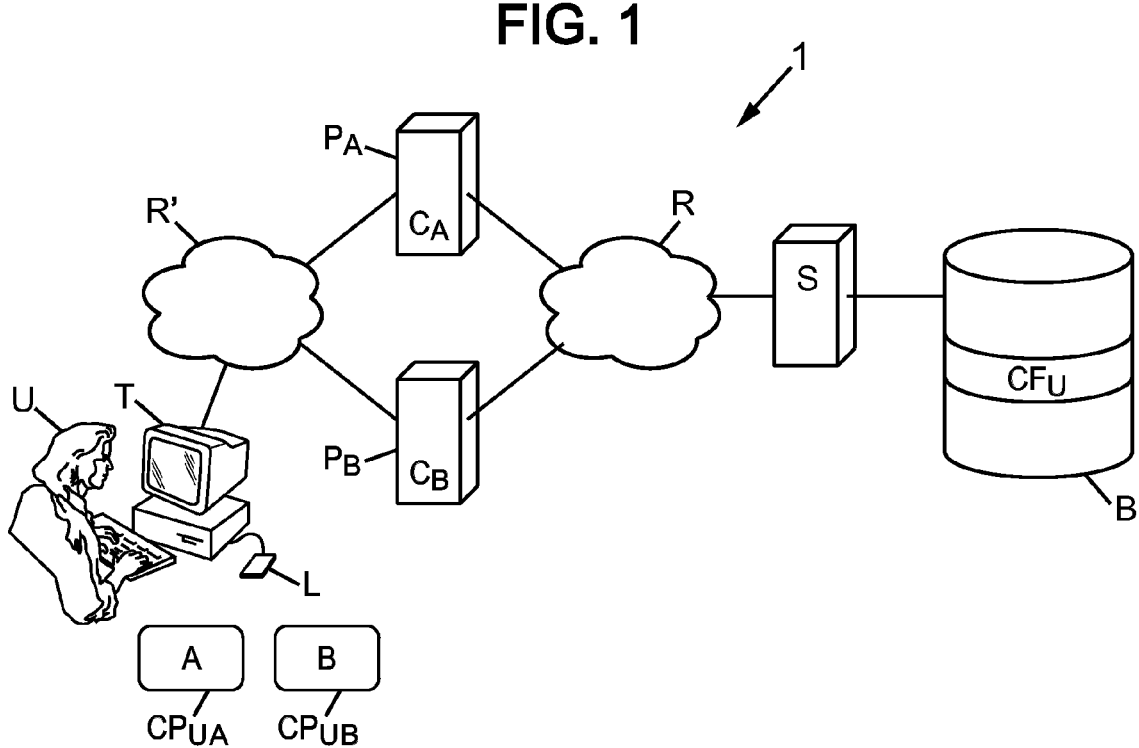
FIG. 1 depicts a system according to an embodiment of the invention.

FIG. 1 depicts a system 1 comprising a server S connected, via a telecommunications network R, to servers $P_A$ and $P_B$ themselves connected via a telecommunications network R' to a plurality of terminals.

The server S comprises a storage database B comprising electronic safes. The server S is adapted to offer users services relating to the use of electronic safes by means of terminals, servers $P_A$ or $P_B$, networks R and R' and the server S.

Amongst the terminals making it possible to access electronic safes are for example personal computers ("PCs"), mobile telephones, personal digital assistants, etc.

FIG. 1 in particular depicts a terminal T used by an individual called U. The terminal T is for example a PC, provided with a display screen and a keyboard, and equipped with an interface for reading and writing to a smart card, an interface that will be called below a smart card reader L.

Let it be considered that a company A offers the user U a hardware security module, for example a smart card $CP_{UA}$, in the colours of the company A (comprising for example its logo and name), with a view to giving access to an electronic safe $CF_U$ dedicated to the user in the database B.

This smart card $CP_{UA}$, once configured, will enable the user to access a safe $CF_U$, consult it, and modify, delete and/or store electronic data therein.

Figure 2:
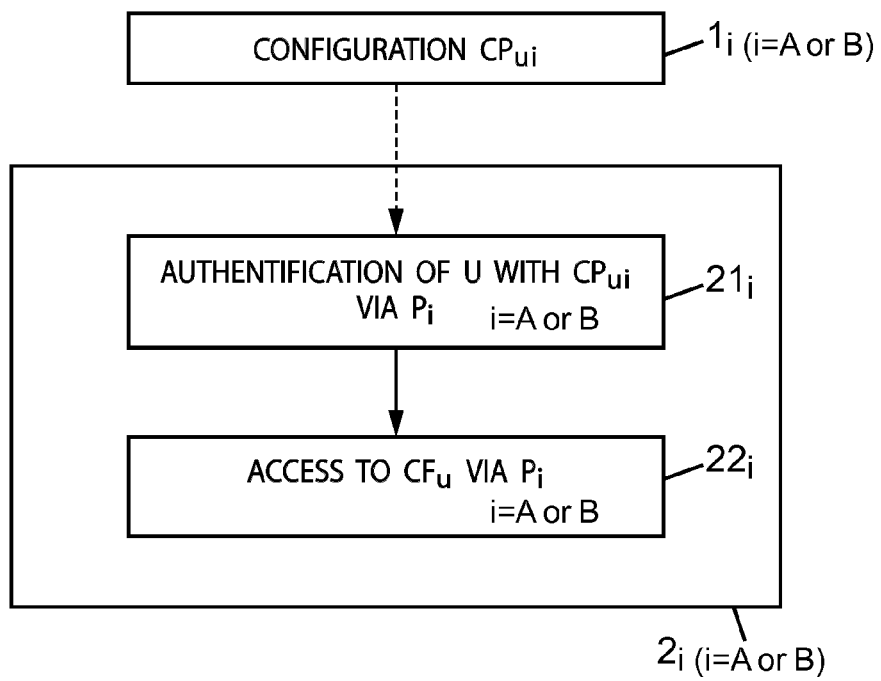
FIG. 2 depicts a method according to an embodiment of the invention.

With reference to FIG. 2, in a step $1_A$ for configuring the smart card $CP_{UA}$, the user U connects from the terminal T to the web portal of the company A hosted by the server $P_A$. There follows a phase of exchanges between an application $C_A$ of the web portal of the company A and the user U via the terminal T.

During this exchange phase, the user indicates his wish to use his electronic safe. It is then requested that the user U insert, into the smart card reader L, the smart card $CP_{UA}$ issued by the company A.

The request for use of the electronic safe $CF_U$ of the user U is then transferred, by the application of the web portal of the company A, from the server $P_A$ to the server S.

The server S then transmits to the terminal T via the server $P_A$:

an authentication certificate $CAUT_{UA}$ and an associated pair of keys (a public key and a private key), intended to subsequently allow authentication of the user U with the server S, with a view to authorising or not the access to the safe $CF_U$;

a signature certificate $CSIG_U$ and an associated pair of keys, intended for signing the data to be stored in the electronic safe $CF_U$; and an encryption certificate $CCHH_U$ and the associated pair of keys, intended for encrypting/decrypting the data to be stored in the electronic safe $CF_U$.

These certificates and associated keys are loaded into the smart card $CP_{UA}$ by means of the smart card reader L.

These certificates and the associated keys, dedicated to the user U, come from one (or more) registration and certification authorities acting as trusted third parties. In one embodiment, the server S itself is this trusted third party.

The smart card $CP_{UA}$ now configured will enable the user U to access his safe $CF_U$ and use it.

In one embodiment, the smart card $CP_{UA}$ makes it possible to have access not only to the safe $CF_U$, which is for example intended to store the personal items of the user, but also to another safe intended to store data relating to the exchanges between the company A and the user U (for example if the user U is an employee of the company A, professional data will be stored in this other safe). Only the card $CP_{UA}$ makes it possible to have access to this other safe.

It should be noted that, prior to recording of the certificates on the smart card $CP_{UA}$, particular procedures for identifying the user are implemented depending on the level of security expected by the server $P_A$ according to embodiment. The user identity can for example be verified during a formal meeting (face to face) with the user and/or from the release of data considered sufficiently personal.

It will now be considered that a company B subsequently offers the user U a smart card $CP_{UB}$ in the colours of the company B with a view also to giving access to the electronic safe $CF_U$ dedicated to the user U.

With reference to FIG. 2, in a step $1_B$ for configuring the smart card $CP_{UB}$, the user U connects from the terminal T (these operations could of course be carried out from another terminal provided with a device for writing data into a smart card) to the web portal of the company B hosted by the server $P_B$.

In a phase of exchanges between an application of the web portal of the company B and the user U, the user U indicates his wish to use his electronic safe and inserts the smart card $CP_{UB}$ into the smart card reader L.

The request for use of the electronic safe of the user U is then transferred, by the application of the web portal of the company B, from the server $P_B$ to the server S.

The server S then transmits to the terminal T via the server $P_B$ an authentication certificate $CAUT_{UB}$ and an associated pair of keys, the signature certificate $CSIG_U$ and its associated pair of keys, and the encryption certificate $CCHH_U$ and its associated pair of keys. These certificates and associated keys are loaded into the smart card $CP_{UB}$ by means of the smart card reader L.

The signature and encryption certificates and the associated keys, stored in the two smart cards held by the user U for use of the safe $CF_U$, are thus identical. On the other hand, the authentication certificates of the user U and the associated keys stored in these two smart cards, for allowing authentication of the user U with the server S when he wishes to access the safe, are distinct.

The smart card $CP_{UB}$ now configured will enable the user U to access his safe $CF_U$ and use it.

In one embodiment, the smart card $CP_{UB}$ issued to the user makes it possible to have access not only to the safe $CF_U$, but also to a safe intended to store data relating to the exchanges between the company B and the user U. Only the card $CP_{UB}$ makes it possible to have access to this safe.

The step $2_A$ below describes the operations for accessing and using the safe $CF_U$ with the help of the smart card $CP_{UA}$.

The user U connects to the server S by means of the application $C_A$ of the portal of the company A and inserts his smart card $CP_{UA}$ into the smart card reader L.

A phase of strong authentication of the user U by the server S then takes place (step $21_A$), on the basis in particular of the authentication certificate $CAUT_{UA}$ and the associated keys. The authentication data are usable after provision to the reader L by the user U of the access code of the smart card $CP_{UA}$.

In the step $21_A$, for example, the server S supplies a random number to the terminal T. The smart card $CP_{UA}$ signs the random number with the secret authentication key of the user U stored in the smart card $CP_{UA}$, then the terminal T transmits the random number thus encrypted to the server S (therefore indicating the authentication data of the user U), which decrypts it using the public authentication key of the user U. If it finds the random number initially transmitted to the terminal T, the user U has been correctly authenticated.

This step takes place for example in the form of an HTTPS session.

As a reminder, strong authentication makes it possible to verify the identity of the user on the basis of at least two factors from amongst what he knows (password, PIN code), what he possesses (smart card, electronic certificate), and what he is (biometric parameter such as a fingerprint, hand, face, etc.).

Once the user U has been authenticated by the server S, he can carry out the storage of new electronic data encrypted and/or signed by means of the signature and encryption keys stored on the smart card CPA, and/or the modification, consultation or deletion of data already stored in the safe $CF_U$ (step $22_A$).

The step 2B below describes the operations for accessing and using the safe $CF_U$ with the help of the smart card $CP_{UB}$.

The user U connects to the server S by means of the application $C_B$ of the portal of the company B and inserts his smart card $CP_{UB}$ into the smart card reader L.

A phase of strong authentication of the user U by the server S then takes place (step $21_B$), on the basis in particular of the authentication certificate $CAUT_{UB}$, the associated keys and the access code provided by the user U for using the authentication data stored on the smart card $CP_{UB}$.

Once the user U has been authenticated by the server S, the user U can carry out the storage of new electronic data encrypted and/or signed by means of the signature and/or encryption keys stored on the smart card $CP_B$, and/or the modification, consultation or deletion of data already stored in the safe $CF_U$ (step $22_B$).

Irrespective of the smart card $CP_{UA}$ or $CP_{UB}$ previously used for storing data in the safe $CF_U$, the user can decrypt these data by accessing the safe by means of the smart card $CP_{UA}$ as well as by means of the smart card $CP_{UB}$.

The authentication data to be provided by the user to the server S which will allow access to the safe $CF_U$ are therefore a function of the portal by which he is accessing, and the smart card used.

The smart card to be used is a smart card associated to the portal and the user authentication data, which are contained in this smartcard, are proper to this portal and cannot be used to access the safe via another portal.

In other words, before carrying out authentication of the user using the authentication data it receives, the server S identifies the entity (i.e. the portal) by means of which the user is requesting access to a safe $CF_U$, and then determines, according to the entity identified, the authentication data by means of which this authentication must be performed.

According to the examples described above, the server verifies the signature of the random number received from the smart card using the public authentication key of the user U which is associated with the entity identified. In the event of successful authentication, that is to say if the server finds after decryption the random number initially transmitted to the terminal T, the user U has been correctly authenticated and the server S authorises access to the safe $CF_U$.

Consequently, if the user requests access to the safe $CF_U$ via the portal of the company A and uses the smart card $CP_{UB}$, access will be refused, and vice versa.

In the embodiment described with reference to the figures, the invention is implemented by considering access to one and the same safe by means of two distinct entities, represented by the servers $P_A$ and $P_B$. The invention can of course be implemented with a number of entities greater than two.

All or some of the steps implemented by the terminal T are performed in one embodiment following execution of computer program instructions on calculation means of the terminal T. In the embodiment described with reference to the figures, the terminal delegates signing and encryption/decryption operations to the smart card by means of the smart card reader of the terminal.

Similarly, all or some of the steps implemented by the server S are performed in one embodiment following execution of computer program instructions on calculation means of the server S.

When the company A wishes to stop the electronic safe supply service for the user U, it requests, from the trusted authority concerned, revocation of the authentication certificate $CAUT_{UA}$ dedicated to the user U. The individual then has access to his safe $CF_U$ only via the portal of the company B, using the smart card $CP_{UB}$.

The invention makes it possible to simplify the management of access to the safe of users. The latter can access one and the same safe and make use of the data stored therein using respective smart cards, provided by different companies or administrations offering them this service, and each configured with authentication data specific to them.

What is claimed is:

1. A method of managing electronic safes comprising:
   authenticating a user requesting access to an electronic safe, said electronic safe being accessible through a plurality of web portals, hosted respectively on a plurality of servers, by means of authentication data provided by the user;
   receiving first authentication data for authenticating said user requesting access to said electronic safe by means of a first web portal among the plurality of web portals, said first authentication data being stored in a first hardware security module assigned to said user and associated specifically with said first web portal,
   receiving second authentication data for authenticating said user requesting access to said electronic safe by means of a second web portal among the plurality of web portals, said second authentication data being stored in a second hardware security module assigned to said user and associated specifically with said second web portal,
   wherein the first authentication data is different from second authentication data.

2. The method according to claim 1, wherein the method further comprises:
   identifying the web portal, among the plurality of web portals, by means of which the user is requesting access to the safe; and
   determining the authentication data depending on the identified web portal.

3. The method according to claim 1, wherein the method further comprises, when the user requests for the first time an access to the electronic safe by means of a first web portal among the plurality of web portals:
   transmitting authentication data which are dependant of said first web portal to a terminal of the user; and
   storing said authentication data in a first hardware security module assigned to the user and associated specifically with said first web portal,
   wherein the authentication data transmitted and stored in the first hardware security module associated with the first web portal is different from authentication data to be transmitted and stored in a second hardware security module associated with a second web portal among the plurality of web portals.

4. The method according to claim 1, comprising:
   signing and/or encrypting, by means of a signature and/or encryption key, the authentication data to be stored on request of said user in said electronic safe, wherein the key used when the user requests storage in said electronic safe by means of a first web portal among the plurality of web portals is identical to the key used when the user requests storage in said electronic safe by means of a second web portal among the plurality of web portals.

5. An electronic safe management server, comprising:
authentication means to authenticate a user requesting access to an electronic safe by means of authentication data provided by the user, said electronic safe being accessible through a plurality of web portals, hosted respectively on a plurality of servers, receiving means to receive first authentication data for authenticating said user requesting access to said electronic safe by means of a first web portal among the plurality of web portals, said first authentication data being stored in a first hardware security module assigned to said user and associated specifically with said first web portal; and said receiving means for receiving second authentication data for authenticating said user requesting access to said electronic safe by means of a second web portal among the plurality of web portals, said second authentication data being stored in a second hardware security module assigned to said user and associated specifically with said second web portal;
wherein the first authentication data is different from second authentication data.

6. The electronic safe management server according to claim 5, further comprising:
means of identifying the web portal, among the plurality of web portals, by means of which the user is requesting access to the electronic safe; and
means of determining authentication data depending on the identified web portal.

7. The electronic safe management server according to claim 5, comprising configuring means arranged to, when the user requests for the first time an access to the electronic safe from the server by means of a first web portal among the plurality of web portals:
transmit authentication data which are dependant of said first web portal to a terminal of the user; and
store said authentication data in a first hardware security module assigned to the user and associated specifically with said first web portal,
wherein the authentication data transmitted and stored in the first hardware security module associated with said first web portal is different from authentication data to be transmitted and stored in a second hardware security module associated with a second web portal among the plurality of web portals.

8. A computer program comprising instructions stored on a non-transitory medium for implementing, during execution of said program on a computer, a step of authenticating a user requesting access to a safe, said safe storing personal items of the user and being accessible through a plurality of web portals, via a web portal among the plurality of web portals hosted respectively on a plurality of servers, by means of authentication data provided by the user, and, when the user requests for the first time an access to the electronic safe by means of a first web portal among the plurality of web portals, a step of transmitting authentication data which are dependant of said first web portal to a terminal of the user, and a step of storing said authentication data in a first hardware security module assigned to the user and associated specifically with said first web portal, wherein the authentication data transmitted and stored in the first hardware security module associated with the first web portal is different from authentication data to be transmitted and stored in a second hardware security module associated with a second web portal among the plurality of web portals.

* * * * *